June 23, 1931.  E. C. BAUER  1,810,997
GLIDER
Filed Jan. 28, 1930   3 Sheets-Sheet 1
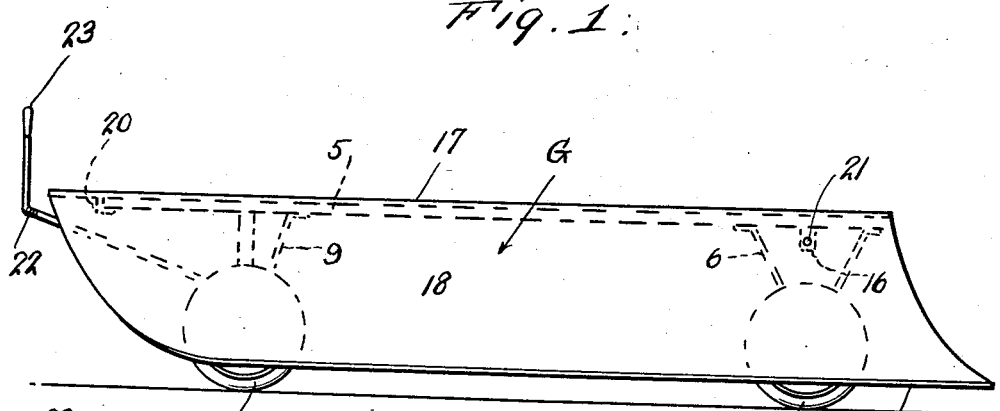
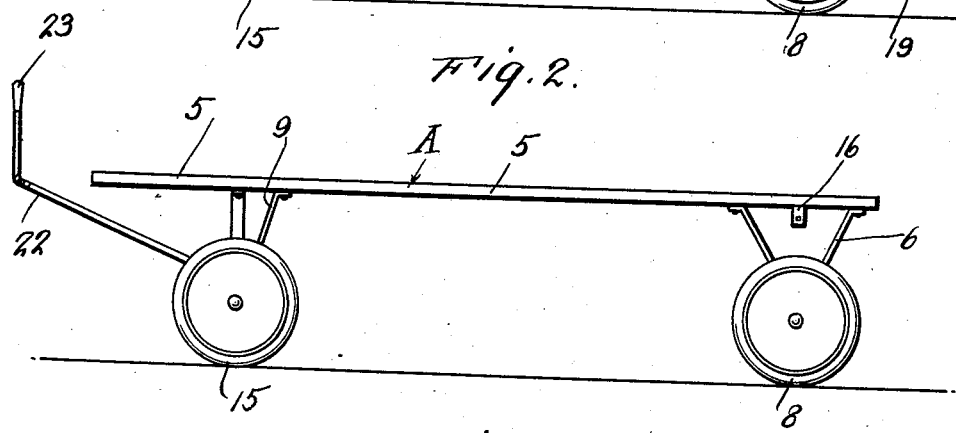
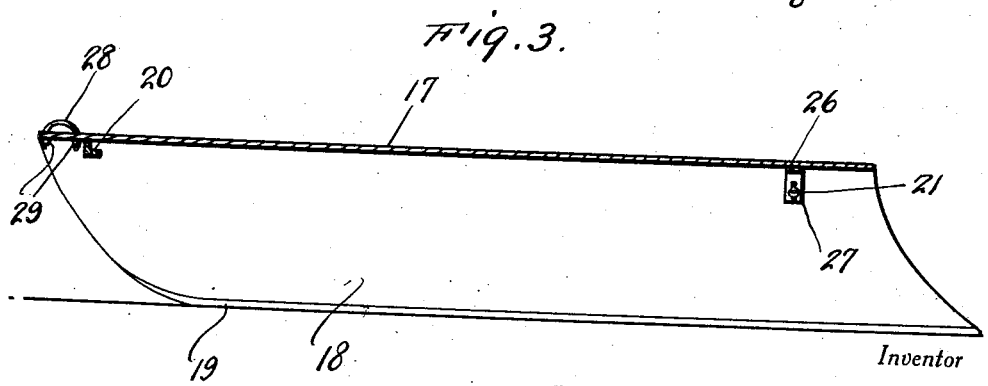
Inventor
*Edward C. Bauer*
By *Clarence A. O'Brien*
Attorney

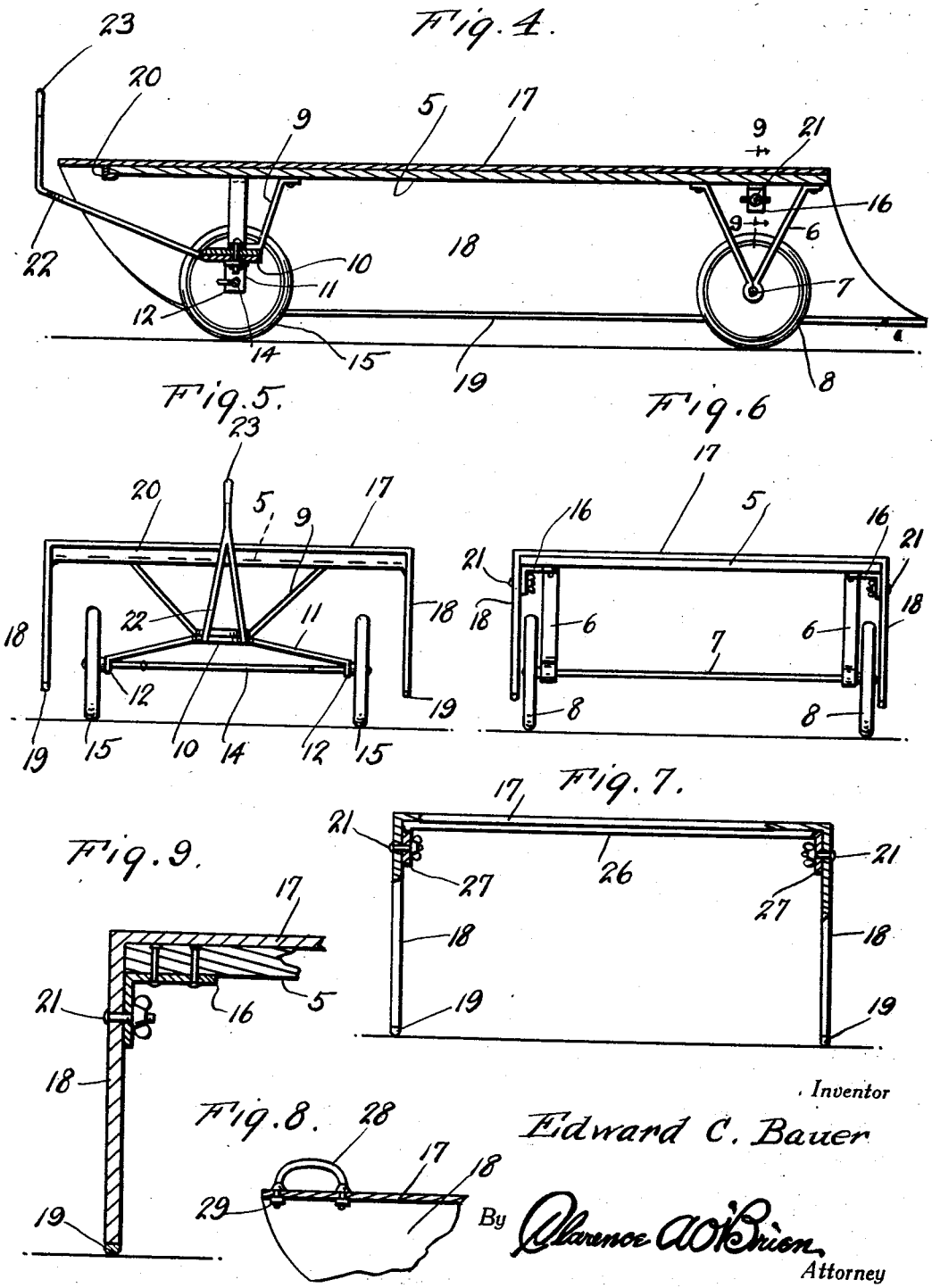

June 23, 1931.  E. C. BAUER  1,810,997
GLIDER
Filed Jan. 28, 1930   3 Sheets-Sheet 3
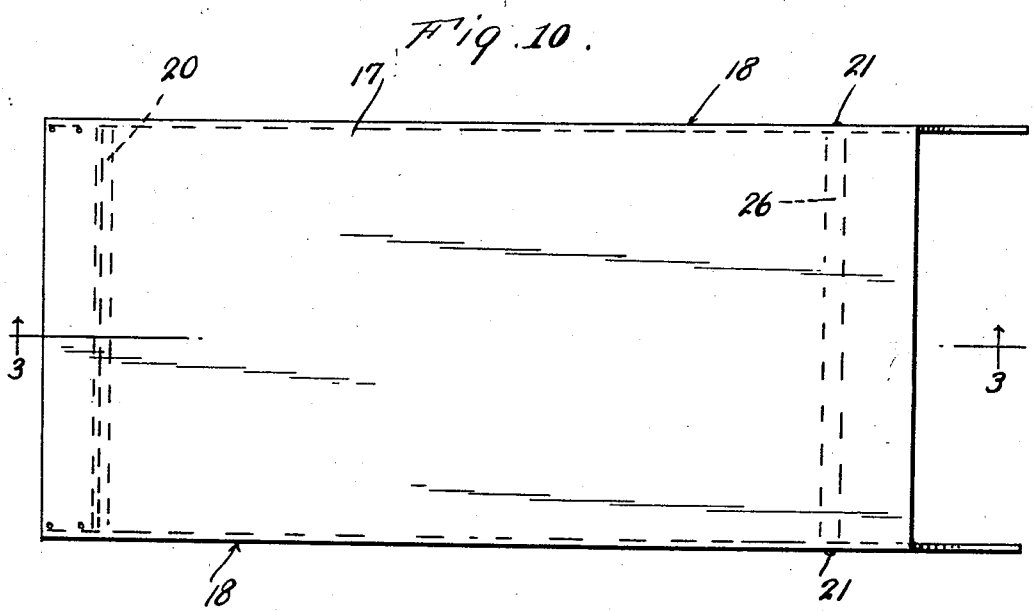
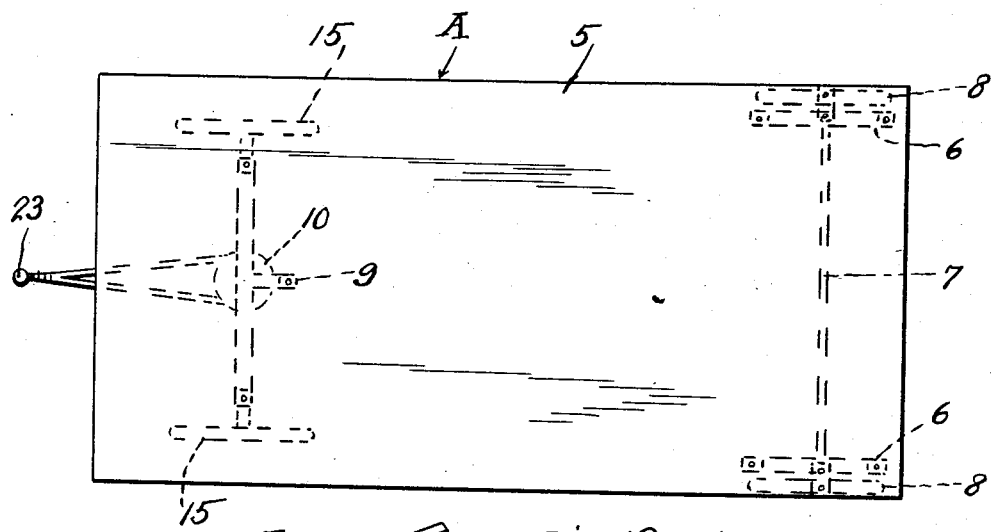
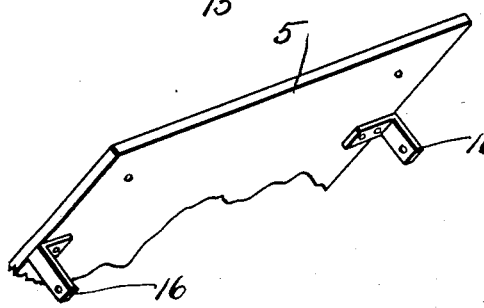
Inventor
Edward C. Bauer
By Clarence A. O'Brien
Attorney Patented June 23, 1931

1,810,997

UNITED STATES PATENT OFFICE

EDWARD C. BAUER, OF CINCINNATI, OHIO

GLIDER

Application filed January 28, 1930. Serial No. 424,001.

The present invention relates to a convertible glider and has for its prime object to provide a glider including the advantages of both a wheeled glider and a sled.

Another very important object of the invention resides in the provision of a sled attachment for a wheeled glider with a quick detachable connection therebetween.

A still further very important object of the invention resides in the provision of a combination glider of this nature which is exceedingly simple in its construction, inexpensive to manufacture, strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the combined glider,

Figure 2 is a side elevation of the wheeled frame,

Figure 3 is a longitudinal section through the attachment,

Figure 4 is a longitudinal vertical section through the combined glider,

Figure 5 is a front elevation thereof,

Figure 6 is a rear elevation thereof,

Figure 7 is a sectional rear elevation of the attachment with the brace therein, Figure 8 is an enlarged detail section through the front end of the attachment showing the handle, Figure 9 is an enlarged detail section taken substantially on the line 9—9 of Figure 4, Figure 10 is a top plan view of the attachment, Figure 11 is a top plan view of the wheeled frame, and Figure 12 is a perspective view of the rear end of the plate of the wheeled frame.

Referring to the drawings in detail it will be seen that the wheeled frame is denoted generally by the letter A and the glider attachment generally by the letter G. This wheeled frame A comprises a plate 5 with depending rear brackets 6 in the lower ends of which is an axle 7 on the ends of which are journalled rear wheels 8.

A front bracket structure 9 depends from the forward portion of the plate 5 and pivotally receives fifth wheel 10 from which extend bracket arm 11 having depending terminals 12 in which is mounted front axle 14 on the ends of which are journalled wheels 15. The front wheels 15 are not spaced as far apart as the rear wheels 8.

Angle brackets 16 are provided on the bottom of the plate 5 adjacent the brackets 6 and adjacent the side edges of the plate 5.

The glider attachment G comprises a top plate 17 with depending side plates 18 having runners 19 on their bottom edges. The forward edges of the plates 18 are curved as is clearly indicated in Figures 1 and 4. Across the under surface of the front portion of the plate 17 is fixed an angle bar 20 adapted to receive the front edge of the plate 5 when the plate 17 rests thereon and the plates 18 have bolts 21 for engaging in the angle brackets 16.

A steering handle 22 projects forwardly from the fifth wheel 10 inclining upwardly and forwardly and terminating in a rising extension 23. It will be noted that when the attachment G is on the wheeled frame the wheels 8 and 15 project down below the runners 19. If the glider attachment is to be used alone, the bolts 21 are disengaged from the brackets 16 and the plate 17 shoved forwardly to disengage the bar 20 from the forward edge of the plate 5 and then the attachment may be lifted off the wheel frame.

It is preferable to provide a brace 26 across the rear portion of the attachment and this brace is provided with angular extensions 27 to be engaged by the bolts 21. A detachable inverted U-shaped handle 28 is placed on the detached attachment having its terminals extended through openings in the forward portion of the plate 17 and held in place by means of nuts 29.

It is thought that the construction, utility and advantages of this invention will now be quite apparent to those skilled in this art without a more detailed description thereof.

The present embodiment of the invention has been disclosed in considerable detail since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a structure of the type embodying, a wheeled frame and a sled attachment, a plate to rest on top of the wheeled frame having depending side runners terminating a distance above the ground outside of the wheels, and quick detachable means fastening the sled attachment upon the wheeled frame.

2. In a structure of the type embodying, a wheeled frame and a sled attachment, a plate to rest on top of the wheeled frame having depending sides forming runners and terminating a distance above the ground outside of the wheels, and quick detachable means between the sled attachment and the wheeled frame, said quick detachable means comprising an angle bar disposed across and on the underside of the sled attachment for receiving the forward edge of the wheeled frame, and angle brackets on the rear of the frame adapted to be engaged with the sled attachment by bolts through the depending plates on the attachment.

3. In a structure of the type embodying, a plate, wheeled supports for said plate, and a sled attachment consisting of a second plate resting on the first mentioned plate and having fixed to its under surface at its front end an angle bar adapted to receive the forward edge of the first mentioned plate, and angle brackets on the first mentioned plate at the rear thereof, and depending runners on the second mentioned plate forming runners terminating above the ground and below the hubs of the wheels of the wheeled supports, and bolts in the runners extending through said brackets on the first mentioned plate.

4. In a structure of the type embodying, a plate, wheeled supports for said plate, and a sled attachment, consisting of a second plate detachably secured on the first mentioned plate and having fixed to its under surface at its front end an angle bar adapted to engage under the forward edge of the first mentioned plate, and angle brackets on the sides of the first mentioned plate at the rear thereof, depending side plates formed on the second mentioned plate constituting runners terminating above the ground and below the hubs of the wheeled supports, and removable bolts extending through said side plates and said brackets, and a separable brace adapted to be disposed across and under the second mentioned plate having angular extensions engageable with said removable bolts when the second mentioned plate is detached from the first mentioned plate.

5. In a combination glider of the type described comprising a wheeled frame carrying a quick-detachable sled structure having runners depending therefrom outside of the wheels of the wheeled frame and below the hubs thereof and spaced from the ground, said wheeled frame having a flat top and depending side brackets on the rear thereof, and said quick-detachable sled structure having a flat body portion adapted to be rested flush upon the said flat top and having an angle bracket near its forward end for engaging under the front edge of the said body portion and bolt holes in the rear portion of its runners opposite said depending side brackets, and removable bolts passed through said holes and through said side brackets for retaining the detachable sled structure on the wheeled frame.

In testimony whereof I affix my signature.

EDWARD C. BAUER.